United States Patent [19]

Katahara

[11] Patent Number: 5,119,343
[45] Date of Patent: Jun. 2, 1992

[54] TRANSDUCERS FOR ACOUSTIC LOGGING TOOL

[75] Inventor: Keith W. Katahara, Allen, Tex.

[73] Assignee: Atlantic Richfield Company, Los Angeles, Calif.

[21] Appl. No.: 497,279

[22] Filed: Mar. 22, 1990

[51] Int. Cl.$^5$ .............................................. G01V 1/40
[52] U.S. Cl. ..................................... 367/75; 181/106; 367/912
[58] Field of Search ................... 310/26; 181/102–106; 367/25, 75, 156, 168, 171, 174, 185, 912

[56] References Cited

U.S. PATENT DOCUMENTS

| | | | |
|---|---|---|---|
| 4,606,014 | 8/1986 | Winbow et al. | 367/75 |
| 4,649,525 | 3/1987 | Angona et al. | 367/75 X |
| 4,862,991 | 9/1989 | Hoyle et al. | 181/106 |
| 4,869,349 | 9/1989 | Minear et al. | 181/102 |
| 4,949,316 | 8/1990 | Katahara et al. | 367/912 X |
| 5,020,036 | 5/1991 | Petermann et al. | 367/168 |

Primary Examiner—Brian S. Steinberger
Attorney, Agent, or Firm—Michael E. Martin

[57] ABSTRACT

A transducer for an acoustic logging tool includes a liquid-filled cavity formed by a substantially rigid housing portion of the tool and having a resilient barrier member disposed between liquid in the wellbore and the liquid in the cavity. A magnetic field extends transversely through the cavity and a member, which may comprise a rigid plate, a flexible member or a quantity of electrically conductive liquid trapped between flexible membranes, is disposed in the cavity for movement normal to the magnetic field. A voltage is generated in response to movement of liquid in the cavity which is proportional to the velocity of the plate or member, or the velocity of the conductive liquid, the length of the conductive path and the intensity of the magnetic field in accordance with the principles of the Lorentz force. Alternatively, electrical current may be caused to flow through the plate, the flexible member or the conductive liquid, thereby causing the Lorentz force to displace the plate, member or conductive liquid to provide a unidirectional pressure wave for generation of flexural waves in the wellbore.

25 Claims, 5 Drawing Sheets

TRANSDUCERS FOR ACOUSTIC LOGGING TOOL

BACKGROUND OF THE INVENTION

1. Field of the Invention

The present invention pertains to transducers useful for acoustic type wellbore logging tools which are responsive to fluid displacements in a well bore to produce an electrical signal or vice versa utilizing the phenomena of the Lorentz force.

2. Background

In the development of acoustic logging tools and similar acoustic signal transmitting and receiving apparatus, several types of signal transmitting and receiving transducers have been developed. One type of transducer which relies on the phenomena associated with piezoelectric materials is described in U.S. Pat. No. 4,649,525 to Angona, et al. Certain improvements in transducers which utilize piezoelectric elements are described in U.S. Pat. No. 4,975,615, issued Dec. 4, 1990, to Keith W. Katahara, Ser. No. 07/354,067, filed May 17, 1989, to Steven G. Peterman, et al, and U.S. Pat. No. 4,949,316 issued Aug. 14, 1990, to Keith W. Katahara, all assigned to the assignee of the present invention.

The tranducers described in the abovementioned patent and patent applications are suitable for certain applications but have limitations as to frequency bandwidth sensitivity. Typically, these transducers offer good sensitivity at or near their resonant frequencies but have poor sensitivity in other ranges which are desirable for use in wellbore logging tools and certain other applications. On the other hand, certain types of transducers, which have very broad band response, such as described in U.S. patent application Ser. No. 07/319,607, filed Mar. 6, 1989, to Keith W. Katahara and assigned to the assignee of the present invention, cannot be readily used as a receiving type transducer but are more desirable for use as signal generating transducers. Accordingly, there has been a need for the development of a type of transducer which has relatively broad frequency bandwidth response, when operating as a receiver or a transmitter, and is structurally uncomplicated.

SUMMARY OF THE INVENTION

The present invention provides a unique acoustic signal transducer which is particularly useful in acoustic type wellbore logging tools for measuring shear wave phenomena as well as certain other acoustic signals being transmitted through wellbore fluid between the logging tool and a formation into which the wellbore has penetrated.

In accordance with one aspect of the present invention, an acoustic signal receiving transducer is provided which has good sensitivity over a relatively broad signal frequency bandwidth. In accordance with another aspect of the present invention, there is provided an improved acoustic signal transducer which operates on the principle of the Lorentz force.

The transducer of the present invention can be adapted for use as a signal transmitter or generator as well as a receiver. The transducer may also be adapted to be used as a directional sonar transducer.

In one embodiment of the invention, a relatively thin plate member having an electrical conductor path formed thereon is suspended in a cavity within a logging tool housing, which cavity is filled with a non-conductive liquid which responds to pressure waves transmitted through borehole fluid to the tool to displace the plate member within a magnetic field to thus generate a voltage signal which is proportional to the velocity of the plate member. This signal may be integrated to determine displacement of the plate member and, of course, frequency of displacement for measuring the propagation of shear and other pressure wave phenomena through the borehole fluid. In another embodiment of the invention the transducer includes a flexible membrane having a conductive coating thereon and disposed in the liquid filled cavity.

Still further, another embodiment of the invention includes a quantity of electrically conductive fluid contained within a cavity and which fluid is operable to be displaced in response to the propagation of pressure waves acting on a membrane separating the transducer fluid from a fluid medium which transmits the wave, such as a wellbore fluid surrounding a logging tool.

Those skilled in the art will further appreciate the abovedescribed advantages and superior features of the present invention together with other unique aspects thereof, upon reading the detailed description which follows in conjunction with the drawing.

DESCRIPTION OF A PREFERRED EMBODIMENT

Figure 1:
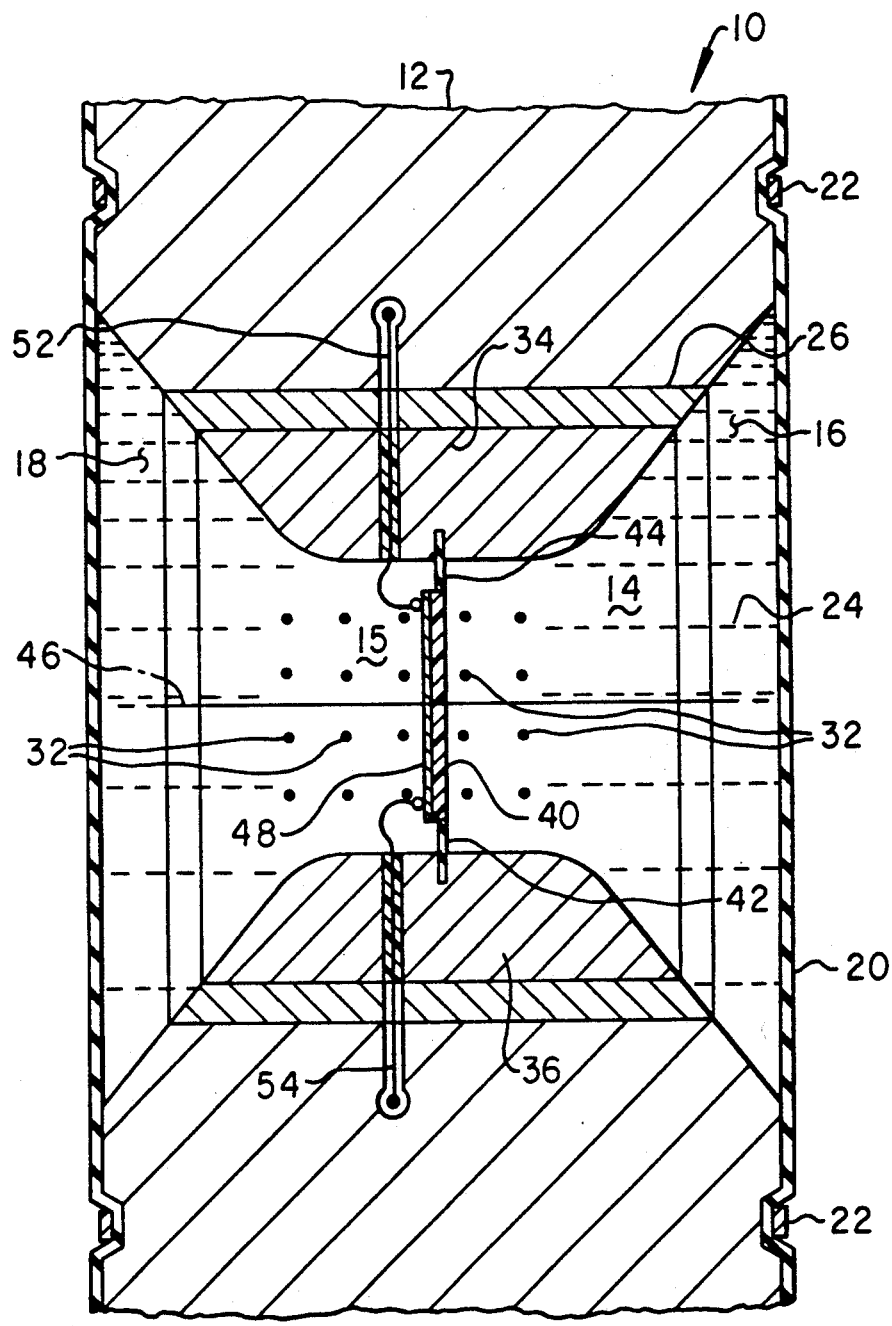
FIG. 1 is a vertical central section view taken generally along the line 1—1 of FIG. 2.

In the description which follows, like parts are marked throughout the specification and drawing with the same reference numerals, respectively. The drawing figures are not necessarily to scale and certain features may be shown in schematic form in the interest of clarity and conciseness.

The present invention pertains to a transducer particularly adapted to be disposed in a logging tool for performing acoustic logging of an earth formation from a wellbore which is filled with a liquid at least in the zone in which the tool operates. Referring to FIG. 1, the illustration is that of a portion of a logging tool 10 having a relatively massive housing 12 which is substantially rigid when compared with certain other elements of the tool to be described in detail herein. The housing 12 includes a fluid-filled cavity 14 which has opposed flared portions 16 and 18 interconnected by a central cavity portion 15. The cavity 14 is closed by a barrier comprising a resilient elastomeric tubular sleeve 20 which is secured to the housing 12 in a fluid tight manner by spaced apart clamps 22. The cavity 14 is preferably filled with an electrically insulating liquid such as a fluorosilicone oil or a polyether, such liquid being indicated generally by the numeral 24.

Figure 2:
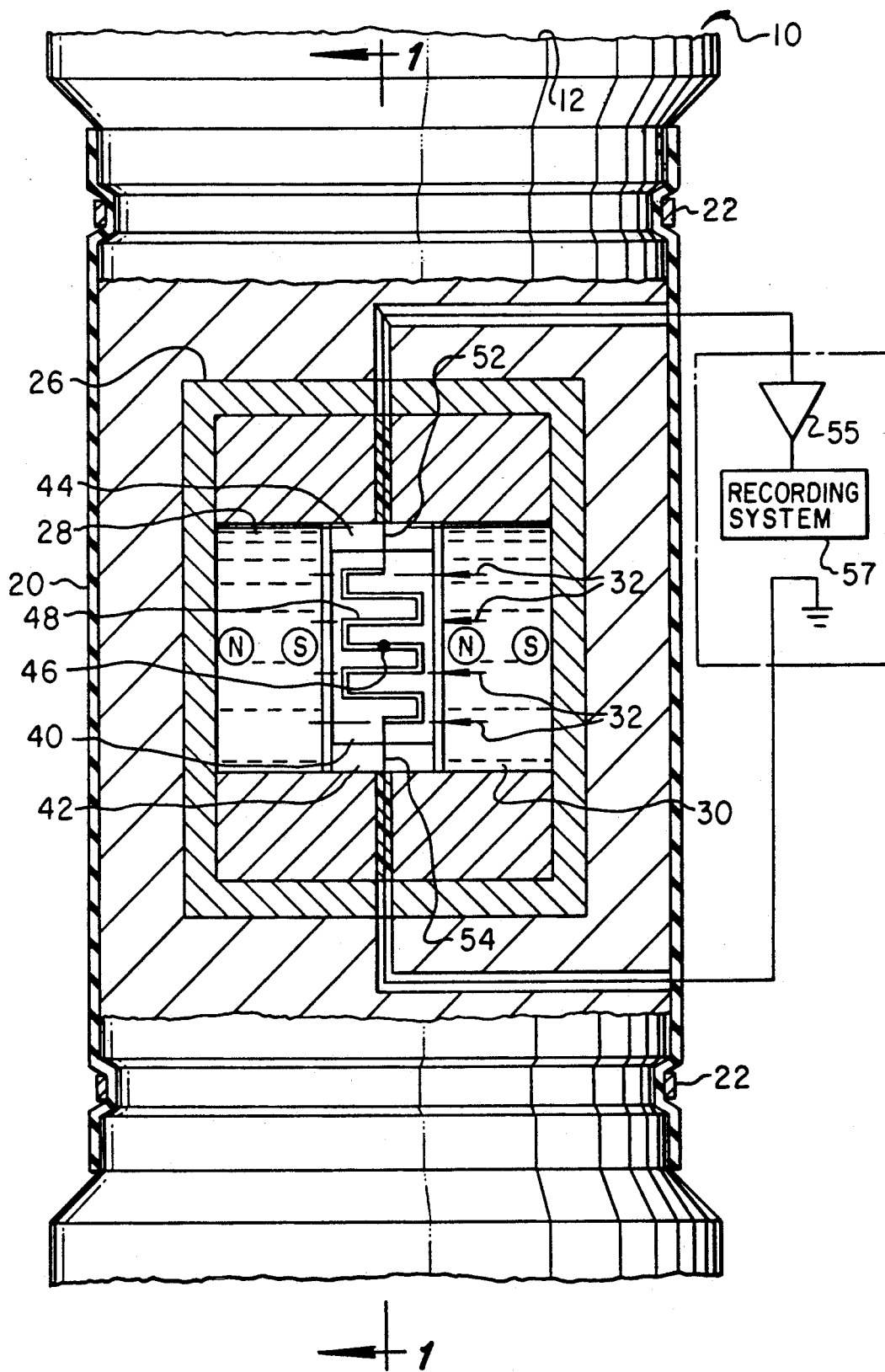
FIG. 2 is a side elevation, partially sectioned, of a portion of an acoustic logging tool, showing certain features of the present invention.

Referring also to FIG. 2, the housing 12 supports within the cavity 14 a generally rectangular, soft iron frame 26 which is suitably secured in the cavity in the position illustrated. The frame 26 supports a pair of permanent magnets 28 and 30 which are arranged to have their poles oriented as illustrated and to generate a magnetic field having magnetic flux lines of force 32 extending across the cavity 15 which is defined by the magnets 28 and 30 and by opposed non-magnetic support members 34 and 36. The frame 26, being of a magnetically "soft" material enhances the flow of the magnetic flux in the direction illustrated in FIG. 2. The magnets 28 and 30 may be of the so-called alnico or samarium-cobalt types or other materials of suitably high retentive magnetic properties. Electromagnets may also be used.

The cavity portion 15 forms somewhat of a venturi type passage with respect to the flared portions 16 and 18 and is so formed by the support members 34 and 36, as illustrated in FIGS. 1 and 2. The cavity portion 15 has disposed therein a generally rectangular, thin plate member 40 which is proportioned to occupy a major portion of the cross-sectional area of the cavity portion 15, as indicated in FIG. 2. The plate member 40 is substantially rigid and is preferably of a low density non-electrically conductive material, such as plastic. The plate 40 is supported in the cavity portion 15 by opposed flexible hinge-like support members 42 and 44. The support members 42 and 44 may be formed of a relatively freely stretchable material such as an elastomer to allow for the plate 40 to be displaced in an oscillatory manner along a central longitudinal axis 46 of the cavity portion 15 in response to movement of fluid 24 within the cavity 14.

In response to a flexural wave passing through the aforementioned wellbore fluid in which the tool 10 is to be disposed, the mass of the housing 12 is sufficient to preclude any significantly measurable displacement while the thin-walled sleeve 20 will respond to wellbore fluid displacement and will effect displacement of the fluid 24 from, for example, the cavity portion 16 to the cavity portion 18 by way of the cavity portion 15. Fluid is displaced, of course, in the opposite direction also in response to pressure wave action impinging on the sleeve 20. Since the plate 40 is disposed in the cavity portion 15 and extends in a plane generally parallel to the magnetic flux lines 32, movement of the plate along the axis 46 will be in a direction perpendicular to the magnetic field generated by the magnets 28 and 30.

The plate 40 has a conductor in the form of a relatively thin coating 48 disposed on at least one surface thereof. The conductor 48 may take the configuration illustrated in FIG. 2, that is being a somewhat serpentine conductive path extending across the plate 40 between opposed conductive leads 52 and 54 connected to opposite ends of the conductor 48. The conductor 48 preferably has a resistance sufficiently large, compared to the resistance of the leads 52 and 54, such that an electrical signal may be conducted to a suitable amplifier 55, FIG. 2, of conventional design, and which is connected to a suitable recording system 57. The conductor 48 may be formed on the plate 40 by conventional means such as by sputtering or vapor deposition in the presence of a masking template, not shown. A metal coating of a few hundred angstroms thickness is believed to serve very well as the conductor 48.

The plate member 40 is preferably relatively rigid compared to the hinge supports 42 and 44 and is preferably formed of a material having a density similar to the liquid 24. Moreover, the density of the liquid 24 should be approximately equal to that of the liquid in the aforementioned wellbore which would typically be a well drilling mud composition or the like. The aforementioned fluorosilicone oils, having specific gravities in the range of 1.4 to 1.5, are thus well suited for use as the liquid 24. The material of which the plate member 40 is made could be selected from any number of engineering plastics such as polyimides or polyetherimides, polyethersulfones or polyetheretherketones. The material for the hinge supports 42 and 44 may be selected from any of the soft rubber materials available such as a fluorosilicone elastomer. The primary consideration is that the plate member 40 be as free as possible to move with the liquid 24 through the cavity portion 15, generally along the axis 46.

The function of the transducer illustrated in FIGS. 1 and 2 and comprising the overall combination described hereinabove is to generate a voltage between the conductors 52 and 54 which may be amplified by the amplifier 55. This voltage is proportional to the velocity of fluid flowing through the cavity portion 15 which drives the plate 40 in a generally oscillatory manner along the axis 46. This voltage is generated as a result of the so-called Lorentz force which is based on the principle that a charge q moving with a velocity v perpendicular to a magnetic field B will be subject to a force F;

$$F = qvB \tag{1}$$

which force is in a direction perpendicular to both the velocity vector and the magnetic field. In equation (1) and the subsequent equations, the International System of units is used. Accordingly "F" is in newtons, "q" is in coulombs, "V" is in volts, "v" is in meters per second and "B" is in webers per meter squared. Thus, in regard to the conductor 48 formed on the plate 40, positive charges accumulate at one end of the conductor and negative charges at the other end until an electrical field E develops to precisely counterbalance the Lorentz force:

$$F = -qE = -qV/d \tag{2}$$

where V is the voltage across the coating 48 and d is the length of the conductor 48.

Combining equation (1) and (2) provides:

$$V = -dBv \tag{3}$$

Figure 3:
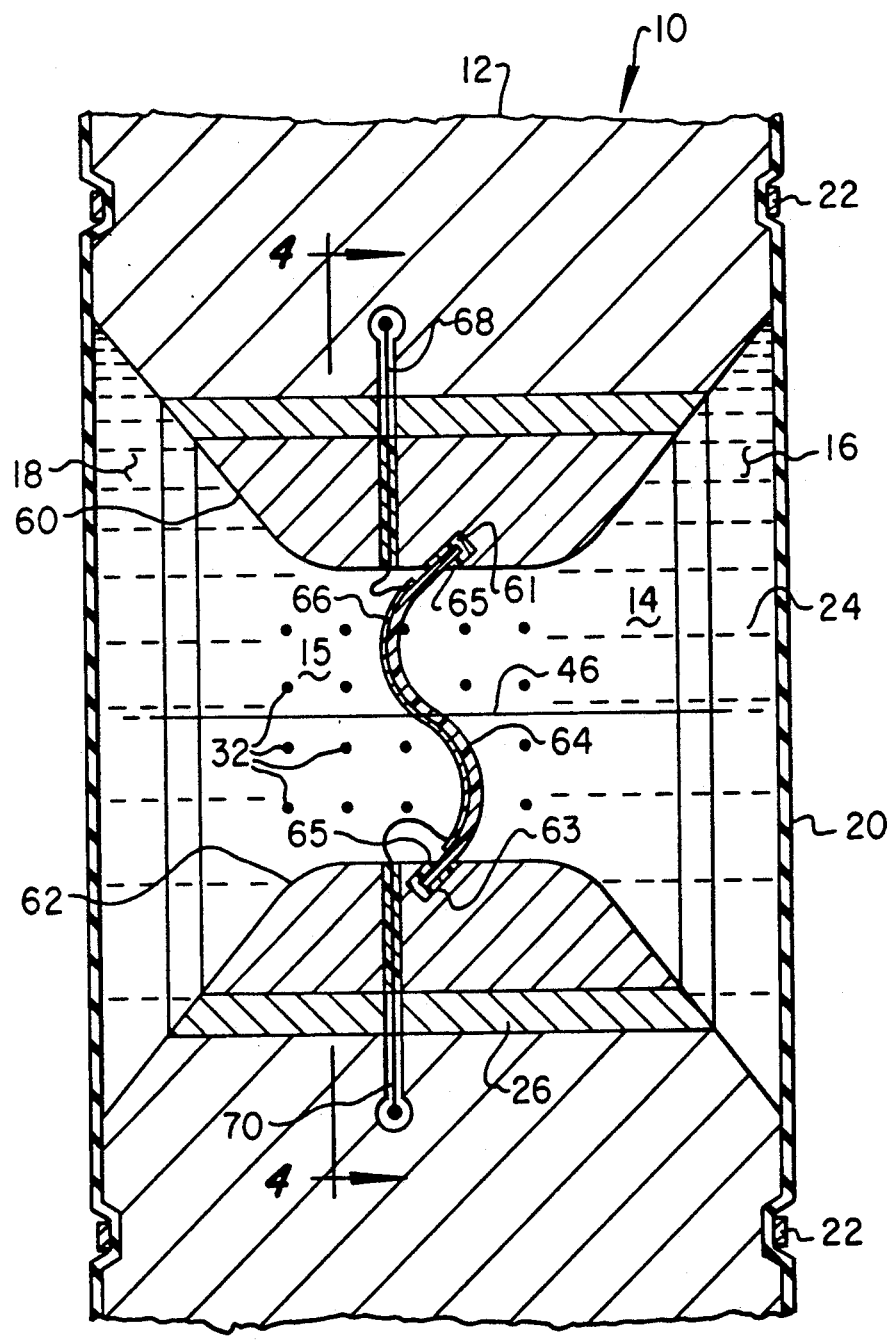
FIG. 3 is a central section view similar to FIG. 1 of a first alternate embodiment of a transducer in accordance with the present invention.
Figure 4:
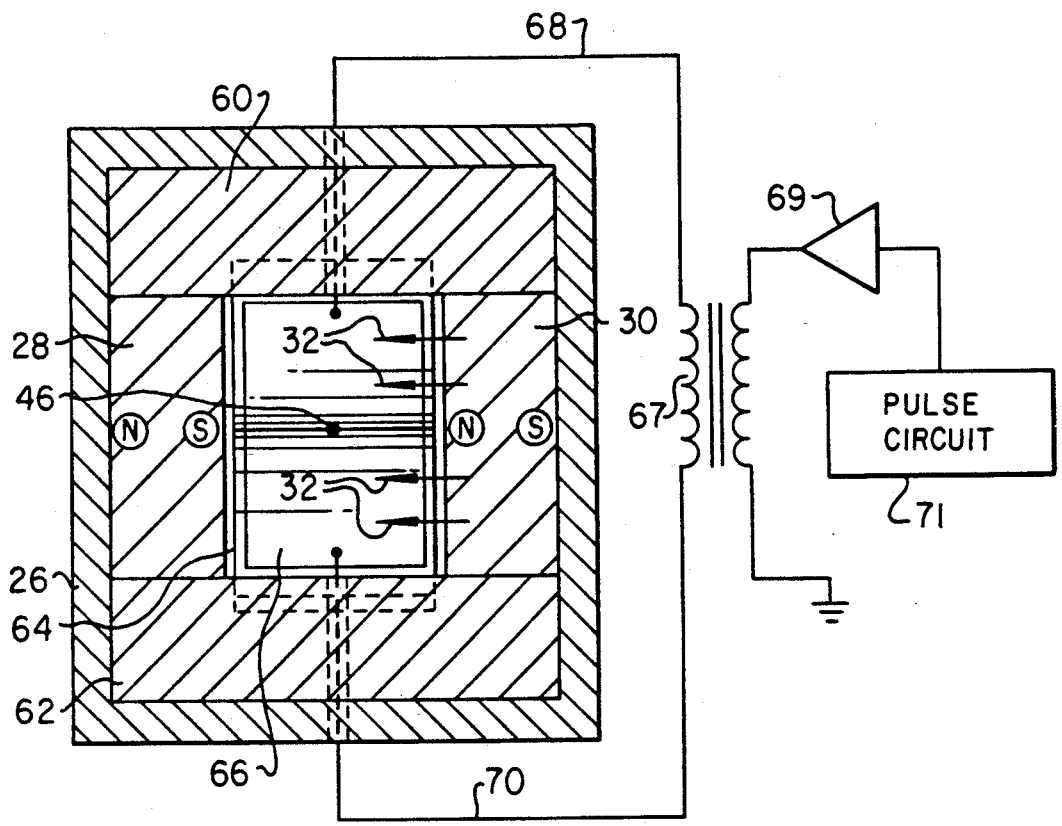
FIG. 4 is a detail section view taken along the line 4—4 of FIG. 3.

Accordingly, it will be observed from the foregoing that the voltage V is proportional to the velocity v and thus the transducer described in conjunction with FIGS. 1 and 2 is responsive to velocity rather than force or displacement. Moreover, the transducer of the present invention can be easily designed to not have resonances within the frequency band of interest (approximately three kHz and below). It is inherently a broad band device with a basically flat response to the velocity of the fluid 24. Referring now to FIGS. 3 and 4, there is illustrated an alternate embodiment of the present invention adapted to be used as a signal transmitter or generator, and wherein the frame 26 includes therewithin the aforementioned spaced apart magnets and opposed supports 60 and 62 similar to the supports 34 and 36. The supports 60 and 62 are each provided with generally angular extending slots 61 and 63 which receive opposite ends of a relatively thin flexible membrane 64. The membrane 64 is preferably anchored in the support members 60 and 62 by a suitable adhesive 65 such as an epoxy material disposed in the slots 61 and 63. The membrane 64 is provided with conductor means comprising a metallic coating 66 formed thereon and of high conductivity, namely, gold. Conductors 68 and 70 are connected to opposite ends of the coating 66 and, in the embodiment shown, are connected to a transformer 67, FIG. 4. The transformer 67 is also operably connected to a power amplifier 69 which is suitably driven by a pulse generating circuit 71.

A current imposed on the coating 66 is acted on by the magnetic field represented by the magnetic flux lines 32 whereby a Lorentz force, which is perpendicular to both the current direction and the direction of the magnetic field, acts on the flexible membrane 64 to effect displacement of same together with the fluid 24 and, of course, the sleeve 20. Displacement of the sleeve 20 will displace drilling mud or other liquid in the wellbore in which the tool 10 is disposed. Displacement of the membrane 64 produces an acoustic radiation wave of dipole symmetry and the conductive coating 64, which has a low resistance, may be driven to deliver a spike type pulse, a square pulse, a sine burst, a swept frequency wave or other type of excitation in accordance with a selected wellbore acoustic measurement method. An effective transmitter type transducer will require relatively large currents to be conducted through the coating 66 together with a relatively strong magnetic field. Because of limitations of the current carrying capacity of the coating 66 and because of limitations on the field strength that can be produced in a wellbore logging tool, the use of a Lorentz force type transducer as described may not have all the advantages but does have an advantage of a relatively broad frequency bandwidth capability. Those skilled in the art will recognize that the transducer illustrated in FIGS. 3 and 4 may, when connected to a circuit similar to that shown in FIGS. 1 and 2, be used as a signal receiving transducer. Conversely, the transducer illustrated in FIGS. 1 and 2 may be used as a signal transmitting transducer when connected to a circuit similar to that shown in FIGS. 3 and 4. The geometry of the conductive coatings 48 or 66 should also change somewhat depending on whether the transducers are used in the receiver or transmitter modes of operation.

The membrane 64 is also of a width which will essentially occupy nearly all of the cross-sectional area of the cavity portion 15. The flexible membrane 64 may be made of a polyimide film and is preferably curved in a manner that allows it to displace freely along the axis 46 with the movement of the liquid 24 in either direction while being able to return to a central equilibrium position when not subjected to any external forces. The membrane 64 may also be configured with multiple folds in an accordion or bellowslike fashion.

Figure 6:
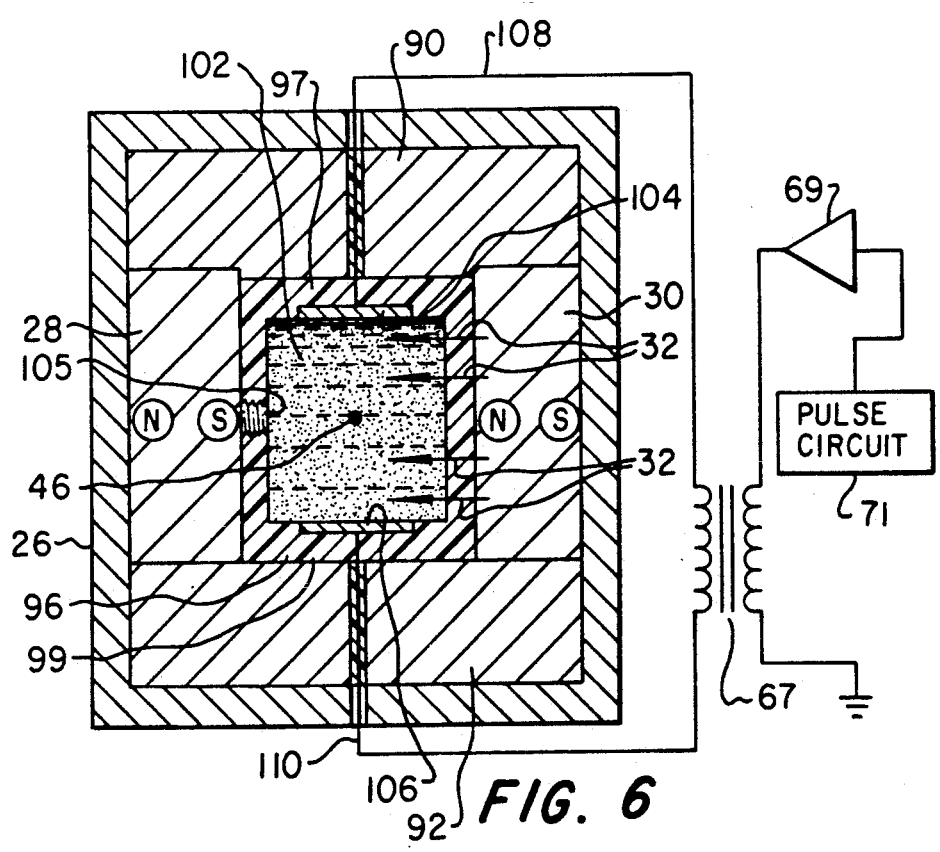
FIG. 6 is a detail section view taken along line 6—6 of FIG. 5.
Figure 5:
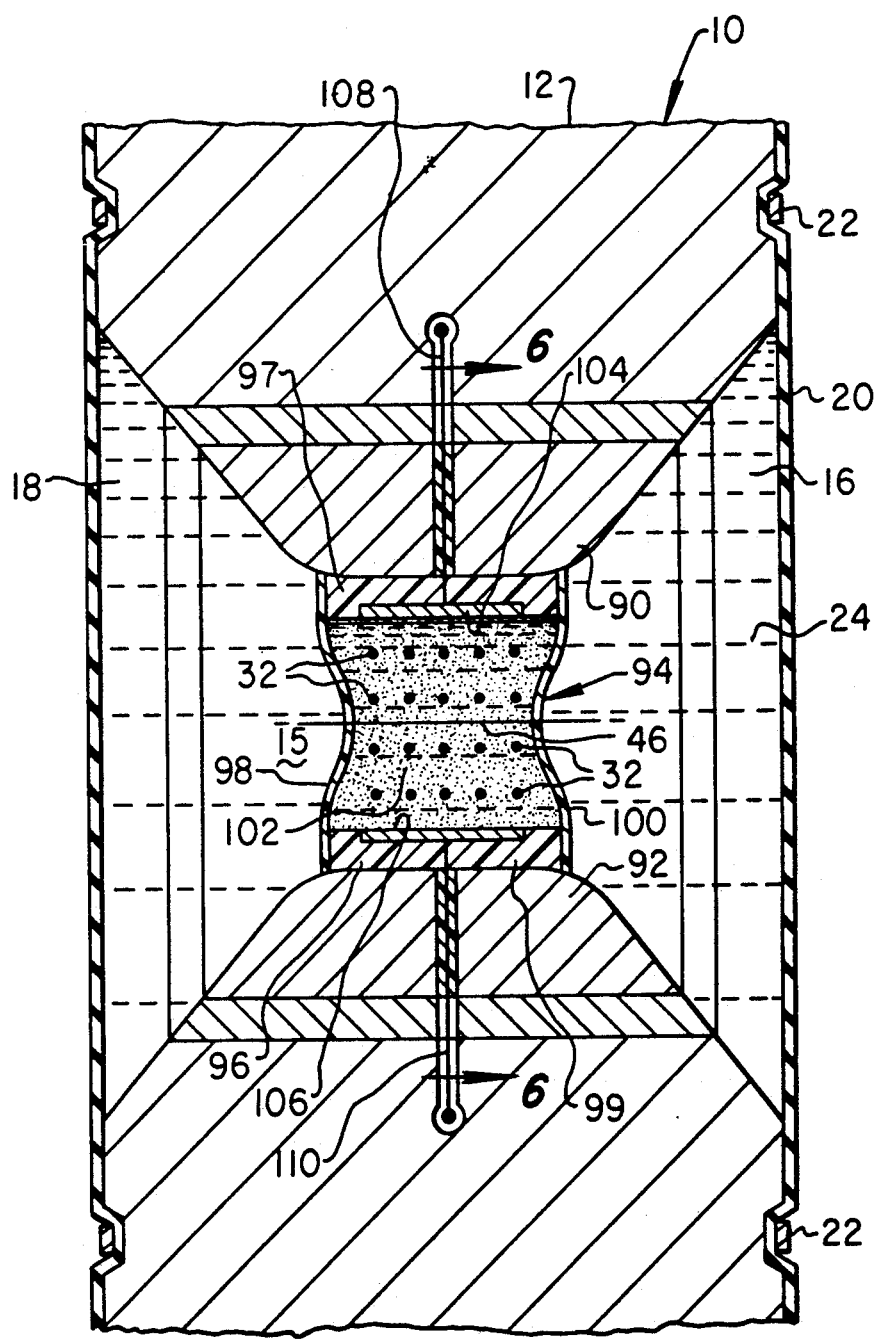
FIG. 5 is a central section view similar to FIG. 1 of a second alternate embodiment of the present invention.

Referring now to FIGS. 5 and 6, there is illustrated yet another embodiment of a transducer in accordance with the present invention which may be adapted to operate as a signal receiving as well as a signal transmitting type transducer. The transducer illustrated in FIGS. 5 and 6 may utilize the housing 12 including the frame 26, magnets 28 and 30 and supports 90 and 92, similar to the supports 34 and 36. The throat portion of the cavity 15 is occupied by a transducer generally designated by the numeral 94 which includes a generally rectangular frame 96 formed of a suitable plastic such as polyimide. Opposite sides of the frame 96 are enclosed by generally flexible polyimide membranes 98 and 100 which are slightly curved inwardly, as indicated in FIG. 5, are flexible and serve together with the frame 96 to contain a quantity of electrically conductive liquid 102 such as brine.

Opposed top and bottom members 97 and 99 of the frame 96 support electrical conductor members or electrodes 104 and 106, suitably disposed in recesses formed in the top and bottom members and in contact with the brine 102. Electrical leads 108 and 110 are connected to the electrodes 104 and 106, respectively, and may be connected to the circuit illustrated in FIG. 2, or alternatively, the circuit illustrated in FIG. 4, depending on which mode it is intended to operate the transducer of FIGS. 5 and 6. The cavity formed by the frame 96 together with the membranes 98 and 100 may be filled through a port which is closed by a suitable removable plug 105, FIG. 6. The magnetic flux lines 32 pass through the brine 102. The surfaces of the electrodes 104 and 106 exposed to the brine 102 may be coated with a non-corrosive metallic coating such as platinum, for example.

When a flexural wave propagates along a wellbore to displace the sleeve 20 and the fluid 24, the membranes 98 and 100 respond to displace the brine 102 and a voltage is generated across the electrodes 104 and 106 in accordance with equation (3). Conversely, and with the conductors 108 and 110 connected to the circuit illustrated in FIG. 6, a current may be imposed across the electrodes 104 and 106 through the brine 102 which will effect displacement thereof in the presence of a magnetic field having the direction indicated by the flux lines 32.

The frame 96 may be provided by machining four polyimide plates secured together with a suitable adhesive after installing the electrodes 104 and 106. The membranes 98 and 100 may also be attached to the side or end faces of the frame 96 with a suitable adhesive.

Not only are the transducers of the present invention substantially unaffected by mechanical resonances in the frequency band of interest but such transducers are mechanically uncomplicated, relatively rugged and maintenance free. The materials for the other components of the logging tools illustrated and described herein may be those used in conventional logging tool construction.

Although preferred embodiments of the present invention have been described, those skilled in the art will recognize that various substitutions and modifications may be made thereto without departing from the scope and spirit of the invention as recited in the appended claims.

What is claimed is:

1. A transducer useful in a logging tool for generating an electrical signal related to the propagation of an acoustic wave in wellbore, said transducer comprising;
   a substantially rigid housing including a cavity formed therein;
   flexible barrier means closing said cavity;
   a quantity of liquid in said cavity;
   means for generating a magnetic field of predetermined intensity and having magnetic lines of force extending through said liquid generally normal to an axis of said cavity;

a member disposed in said cavity and in said magnetic field and moveable at a velocity in a direction substantially normal to said magnetic lines of force in response to displacement of said liquid in said cavity;

electrically conductive means disposed on said member;

conductor means connected to said electrically conductive means at spaced apart points on said member; and means for supporting said member for movement in a direction normal to said magnetic lines of force in response to displacement of liquid in said cavity for generating a voltage which is proportional to the intensity of said magnetic field and the velocity of said member during movement thereof in response to said displacement of said liquid.

2. The transducer set forth in claim 1 wherein:
the voltage generated by said member may be measured by the equation:

$$V = dBv$$

wherein V equals the voltage generated across said conductors, d is the length of the conductive means, B is the intensity of the magnetic field and v is the velocity of the member in a direction substantially normal to the magnetic lines of force.

3. The transducer set forth in claim 1 wherein:
said member comprises a generally planar element disposed in a portion of said cavity which permits displacement of fluid in response to an acoustic wave impinging on said barrier means.

4. The transducer set forth in claim 3 wherein:
said means for supporting said member comprises flexible hinge means.

5. The transducer set forth in claim 3 wherein:
said conductive means comprises a conductive path formed on said member.

6. The transducer set forth in claim 3 wherein:
said liquid in said cavity is electrically nonconductive.

7. The transducer set forth in claim 1 wherein:
said member comprises a flexible membrane responsive to displacement of liquid in said cavity for moving in a direction generally normal to said magnetic lines of force.

8. The transducer set forth in claim 7 wherein:
said membrane includes an electrical conductor thereon and connected at spaced apart points to said conductor means.

9. The transducer set forth in claim 7 wherein:
said membrane is formed with a predetemined curvature when supported in said cavity in an equilibrium position.

10. The transducer set forth in claim 1 wherein:
said means for generating said magnetic field comprises permanent magnet means disposed adjacent to said cavity.

11. The transducer set forth in claim 10 wherein:
said permanent magnet means comprises a pair of permanent magnets spaced apart and defining therebetween a portion of said cavity.

12. The transducer set forth in claim 10 including:
frame means comprising a magnetically soft material and disposed around said permanent magnet means for redirecting said magnetic lines of force to extend generally transversely across said cavity.

13. The transducer set forth in claim 1 wherein:
said liquid has a density similar to the density of liquid in said wellbore.

14. The transducer set forth in claim 12 wherein:
said member has a density similar to the density of said liquid in said cavity.

15. A transducer useful in a logging tool for disposition in liquid filled wellbore wherein said tool includes a housing including a generally transversely extending cavity formed therein, said transducer comprising:

generally flexible barrier means defining at least in part said cavity and separating said cavity from wellbore liquid;

a quantity of liquid in said cavity;

means for generating a magnetic field having magnetic lines of force extending through said cavity and generally normal to an axis of said cavity;

a member disposed in said magnetic field and movable in a direction generally normal to said magnetic lines of force for displacing said liquid in said cavity;

electrically conductive means disposed on said member;

conductor means connected to said electrically conductive means at spaced apart points on said member; and means for supporting said member for movement in a direction normal to said magnetic lines of force in response to the imposition of an electrical signal on said electrically conductive means for causing said member to displace said liquid in said cavity to generate an acoustic wave in said wellbore liquid.

16. The transducer set forth in claim 15 wherein:
said member comprises a flexible membrane responsive to the imposition of said current on said electrically conductive means to move in a direction generally normal to said magnetic lines of force.

17. The transducer set forth in claim 16 wherein:
said member is formed with a predetermined curvature when supported in said cavity in an equilibrium position.

18. The transducer set forth in claim 15 wherein:
said means for generating said magnetic field comprises magnet means disposed adjacent to said cavity.

19. The transducer set forth in claim 18 wherein:
said magnet means comprises a pair of permanent magnets spaced apart and defining therebetween a portion of said cavity.

20. A transducer useful in a logging tool for generating an electrical signal related to the propagation of an acoustic wave in a wellbore, said transducer comprising:

a housing including cavity formed therein;

a quantity of electrically conductive liquid in said cavity;

flexible barrier means defining a portion of said cavity for containing said liquid;

means for generating a magnetic field of predetermined intensity and having magnetic lines of force extending through said liquid generally normal to an axis of said cavity;

said barrier means being movable in a direction substantially normal to said magnetic lines of force to displace said liquid in said cavity; and conductor means in contact with said liquid at spaced apart points in said portion of said cavity for transmitting an electrical signal having a voltage which is proportional to the intensity of said magnetic field and the velocity of said liquid during said displacement of said liquid in said cavity.

21. The transducer set forth in claim 20 wherein: said means for generating said magnetic field comprises magnet means disposed adjacent to said cavity.

22. The transducer set forth in claim 21 wherein: said magnet means comprises a pair of permanent magnets spaced apart and defining therebetween said portion of said cavity.

23. A transducer useful in conjunction with an acoustic wellbore logging tool for generating acoustic waves in a liquid filled borehole wherein said logging tool includes a housing defining a generally transverse cavity formed therein, said transducer comprising:
 a quantity of electrically conductive liquid disposed in a portion of said cavity;
 flexible barrier means defining said portion of said cavity for containing said electrically conductive liquid in said portion of said cavity;
 means for generating a magnetic field having magnetic lines of force extending through said electrically conductive liquid and generally normal to an axis of said cavity;
 said barrier means being movable in a direction substantially normal to said magnetic lines of force in response to displacememt of said liquid in said cavity;
 conductor means in contact with said liquid in said cavity at spaced apart points; and
 means connected to said conductor means for generating an electrical signal for transmission through said liquid to displace said liquid and said flexible barrier means to generate an acoustic wave in said liquid in said borehole.

24. The transducer set forth in claim 23 wherein: said means for generating said magnetic field comprises magnet means disposed in said cavity.

25. The transducer set forth in claim 23 wherein: said electrically conductive liquid is brine.

* * * * *